United States Patent

Degner et al.

(10) Patent No.: US 9,766,052 B2
(45) Date of Patent: Sep. 19, 2017

(54) SYSTEM AND METHOD FOR DETERMINING ROTOR POSITION OFFSET OF AN ELECTRIC MACHINE

(71) Applicant: Ford Global Technologies, LLC, Dearborn, MI (US)

(72) Inventors: Michael W. Degner, Novi, MI (US); Shailesh Shrikant Kozarekar, Novi, MI (US); Daniel Richard Luedtke, Beverly Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1023 days.

(21) Appl. No.: 13/867,153

(22) Filed: Apr. 22, 2013

(65) Prior Publication Data

US 2014/0312881 A1   Oct. 23, 2014

(51) Int. Cl.
*H02P 21/00* (2016.01)
*G01B 7/00* (2006.01)
*H02P 21/06* (2016.01)

(52) U.S. Cl.
CPC .............. *G01B 7/003* (2013.01); *H02P 21/06* (2013.01); *H02P 2207/05* (2013.01)

(58) Field of Classification Search
CPC .... H02P 21/0035; H02P 21/06; H02P 21/146; H02P 2207/05; Y02T 10/643
USPC .................................................. 318/400.02
See application file for complete search history.

(56) References Cited

U.S. PATENT DOCUMENTS

| 6,208,110 | B1* | 3/2001 | O'Meara ............. B60L 11/1807 318/400.39 |
| 7,388,346 | B2 | 6/2008 | Nishimura et al. |
| 7,803,087 | B2 | 9/2010 | Okubo et al. |
| 7,979,171 | B2 | 7/2011 | Wu et al. |
| 8,078,425 | B2 | 12/2011 | Bernard et al. |
| 8,137,236 | B2 | 3/2012 | Soliman et al. |
| 8,296,032 | B2 | 10/2012 | Wang et al. |
| 8,346,421 | B2 | 1/2013 | Bryan et al. |
| 8,346,422 | B2 | 1/2013 | Chen |
| 2003/0076060 | A1* | 4/2003 | Colosky .................. H02P 6/182 318/400.32 |
| 2005/0067998 | A1* | 3/2005 | Green ................... H02P 25/089 318/701 |
| 2007/0080655 | A1* | 4/2007 | Tesch ...................... H02P 6/185 318/432 |
| 2011/0170318 | A1 | 7/2011 | Chen |
| 2012/0092001 | A1 | 4/2012 | Labiste |
| 2012/0217912 | A1* | 8/2012 | Wu ........................ H02P 21/145 318/400.04 |
| 2012/0242265 | A1 | 9/2012 | Richter et al. |
| 2012/0279791 | A1* | 11/2012 | Anderson ............. E02F 9/2079 180/65.8 |

FOREIGN PATENT DOCUMENTS

DE   102004028877 A1   1/2006
EP   1085644 A2   3/2001

* cited by examiner

*Primary Examiner* — Kawing Chan
*Assistant Examiner* — Bradley Brown
(74) *Attorney, Agent, or Firm* — Carlson, Gaskey & Olds

(57) ABSTRACT

A method according to an exemplary aspect of the present disclosure includes, among other things, detecting a position, including a polarity, of a rotor to detect incorrect rotor position offset of an electric machine without generating torque or motion within the electric machine.

3 Claims, 7 Drawing Sheets

SYSTEM AND METHOD FOR DETERMINING ROTOR POSITION OFFSET OF AN ELECTRIC MACHINE

TECHNICAL FIELD

This disclosure relates to electric vehicles, and more particularly, but not exclusively, to a system for determining rotor position offset of an electric machine of an electrical vehicle.

BACKGROUND

Hybrid electric vehicles (HEV's), plug-in hybrid electric vehicles (PHEV's), and battery electric vehicles (BEV's) (hereinafter collectively referred to as "electric vehicles") differ from conventional motor vehicles in that they employ one or more electric machines in addition to an internal combustion engine to drive the vehicle. Electric vehicles may also be equipped with a battery that stores electrical power for powering the electric machines. In some electric vehicles, an electric machine may also be employed as a generator that is powered by the internal combustion engine in order to generate electrical power to charge the battery.

Electric machines may incorporate synchronous motors having a stator and a rotor with permanent magnets. It may become necessary to determine a position of the rotor in order to meet electric motor control requirements of the electrical vehicle and to avoid inaccurate torque production.

SUMMARY

A method according to an exemplary aspect of the present disclosure includes, among other things, detecting a position, including a polarity, of a rotor to detect incorrect rotor position offset of an electric machine without generating torque or motion within the electric machine.

In a further non-limiting embodiment of the foregoing method, the step of detecting includes applying a voltage and analyzing a current response from the electric machine to determine the position, including the polarity, of the rotor.

In a further non-limiting embodiment of either of the foregoing methods, the step of detecting includes applying a first voltage of a first magnitude and a first frequency to the electric machine to produce a first current response and processing a first current response from the electric machine to determine an alignment of a direct axis of the rotor. The step includes applying a second voltage of a second magnitude and a second frequency to the electric machine and analyzing a second current response from the electric machine to determine the polarity of the direct axis of the rotor.

In a further non-limiting embodiment of any of the foregoing methods, the first magnitude is a different magnitude from the second magnitude.

In a further non-limiting embodiment of any of the foregoing methods, the first frequency is a different frequency from the second frequency.

In a further non-limiting embodiment of any of the foregoing methods, the step of processing includes processing a negative sequence current response from the electric machine.

In a further non-limiting embodiment of any of the foregoing methods, the first voltage is a sinusoidal rotating voltage and the second voltage is a sinusoidal pulsing voltage along the direct axis.

In a further non-limiting embodiment of any of the foregoing methods, the method comprises one of the steps of determining that the polarity of the direct axis is correct if the average value of the first current response is a positive value or determining that the polarity of the direct axis is incorrect if the average value of the first current response is a negative value.

In a further non-limiting embodiment of any of the foregoing methods, the method comprises the step of adjusting the position by 180° if the average value of the first current response is the negative value.

In a further non-limiting embodiment of any of the foregoing methods, the method comprises the step of comparing the position and the polarity of the direct axis of the rotor to information from a sensor configured to monitor the electric machine to determine the incorrect rotor position offset.

In a further non-limiting embodiment of any of the foregoing methods, the method comprises the step of taking a corrective action if the rotor position offset is out of range.

In a further non-limiting embodiment of any of the foregoing methods, the step of detecting is performed in response to a predefined prompt.

In a further non-limiting embodiment of any of the foregoing methods, the predefined prompt is a key-on condition of an electric vehicle.

In a further non-limiting embodiment of any of the foregoing methods, the step of detecting includes using a voltage command tracking method.

In a further non-limiting embodiment of any of the foregoing methods, the step of detecting includes comparing back electromotive force (EMF) to position signal.

A method according to another exemplary aspect of the present disclosure includes, among other things, detecting an incorrect rotor position offset of an electric machine using a decaying sinusoidal torque.

In a further non-limiting embodiment of the foregoing method, using the decaying sinusoidal torque includes applying a first current of a first magnitude to a direct axis of a rotor of the electric machine, applying a second current of a second magnitude to a quadrature axis of the rotor, tapering the second current to a configurable amplitude at a calibratable taper rate, and filtering a position response of the rotor to identify a zero position.

In a further non-limiting embodiment of either of the foregoing methods, the step of tapering includes using one of a linear ramp and an exponential decay.

A rotor position offset detection system according to an exemplary aspect of the present disclosure includes, among other things, an electric machine having a rotor, a sensor that monitors a position of the rotor and a control unit in communication with the sensor. An inverter is in communication with the control unit. The control is unit configured to compare information from the sensor with feedback from the inverter to detect an incorrect rotor position offset of the rotor.

In a further non-limiting embodiment of the foregoing system, the control unit is configured to command a 3-phase voltage to the inverter.

The various features and advantages of this disclosure will become apparent to those skilled in the art from the following detailed description. The drawings that accompany the detailed description can be briefly described as follows.

DETAILED DESCRIPTION

This disclosure relates to a system and method for determining a rotor position offset of an electric machine employed within an electric vehicle to meet electric motor control requirements and to avoid inaccurate torque production by the electric machine. The system and methods disclosed herein provide an in-vehicle diagnostic method for detecting incorrect rotor position offset without the need to undertake relatively costly and time consuming maintenance operations.

Figure 1:
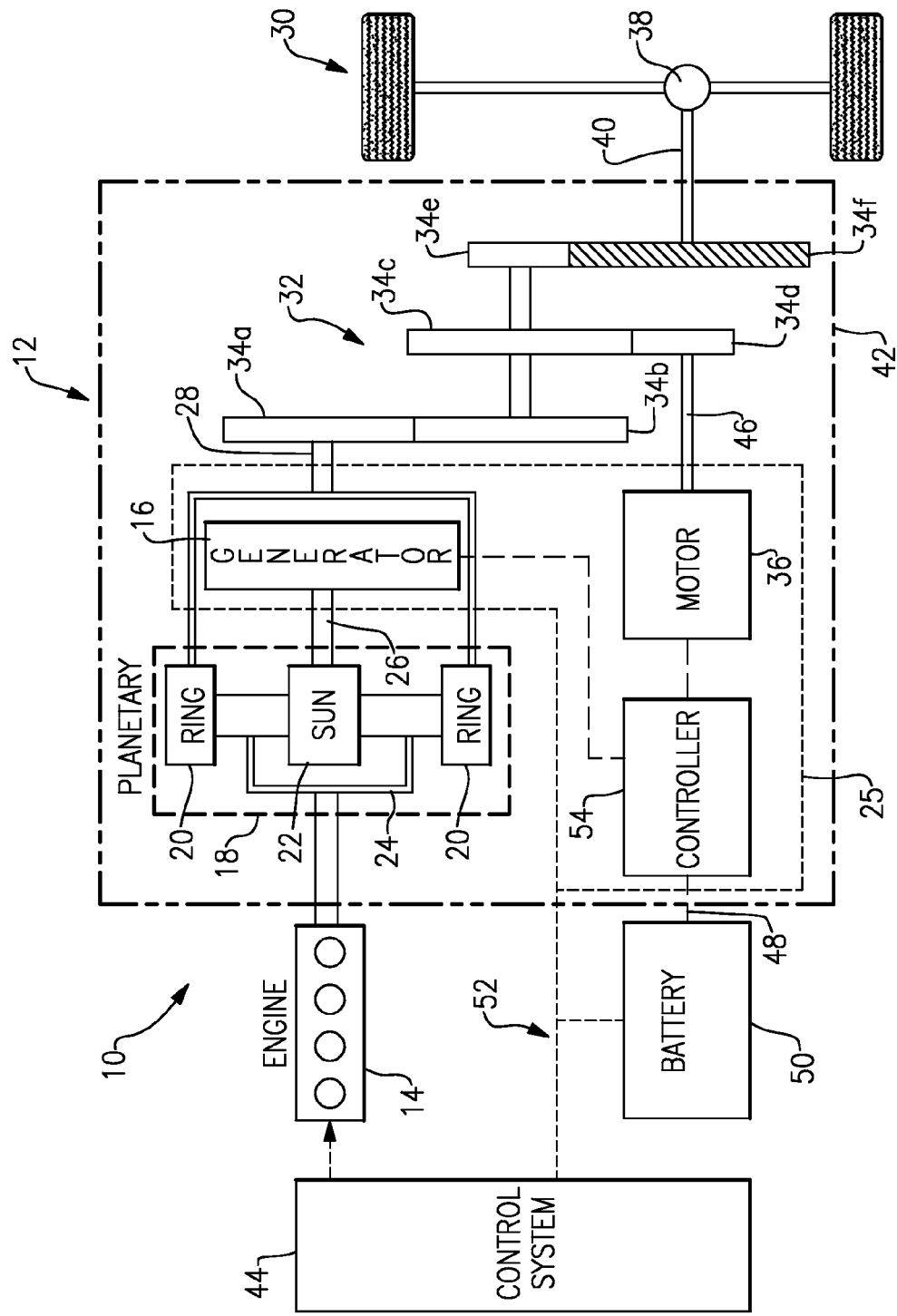
FIG. 1 schematically illustrates a powertrain of an electric vehicle.

FIG. 1 schematically illustrates a powertrain 10 for an electric vehicle 12, such as a hybrid electric vehicle (HEV). Although depicted as a HEV, it should be understood that the concepts described herein are not limited to HEV's and could extend to other electric vehicles, including but not limited to, plug-in hybrid electric vehicles (PHEV's) and battery electric vehicles (BEV's).

In one embodiment, the powertrain 10 is a powersplit powertrain system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electric vehicle 12, as discussed in greater detail below.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery 50. The battery 50 may be a high voltage battery that is capable of outputting electrical power to operate the motor 36 and the generator 16. Other types of energy storage devices and/or output devices can also be incorporated for use with the electric vehicle 12.

The motor 36, the generator 16, the power transfer unit 18, and the power transfer unit 32 may generally be referred to as a transaxle 42, or transmission, of the electric vehicle 12. Thus, when a driver selects a particular shift position, the transaxle 42 is appropriately controlled to provide the corresponding gear for advancing the electric vehicle 12 by providing traction to the vehicle drive wheels 30.

The powertrain 10 may additionally include a control system 44 for monitoring and/or controlling various aspects of the electric vehicle 12. For example, the control system 44 may communicate with the electric drive system 25, the power transfer units 18, 32 or other components to monitor and/or control the electric vehicle 12. The control system 44 includes electronics and/or software to perform the necessary control functions for operating the electric vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 may also communicate with a battery control module of the battery 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

Figure 2:
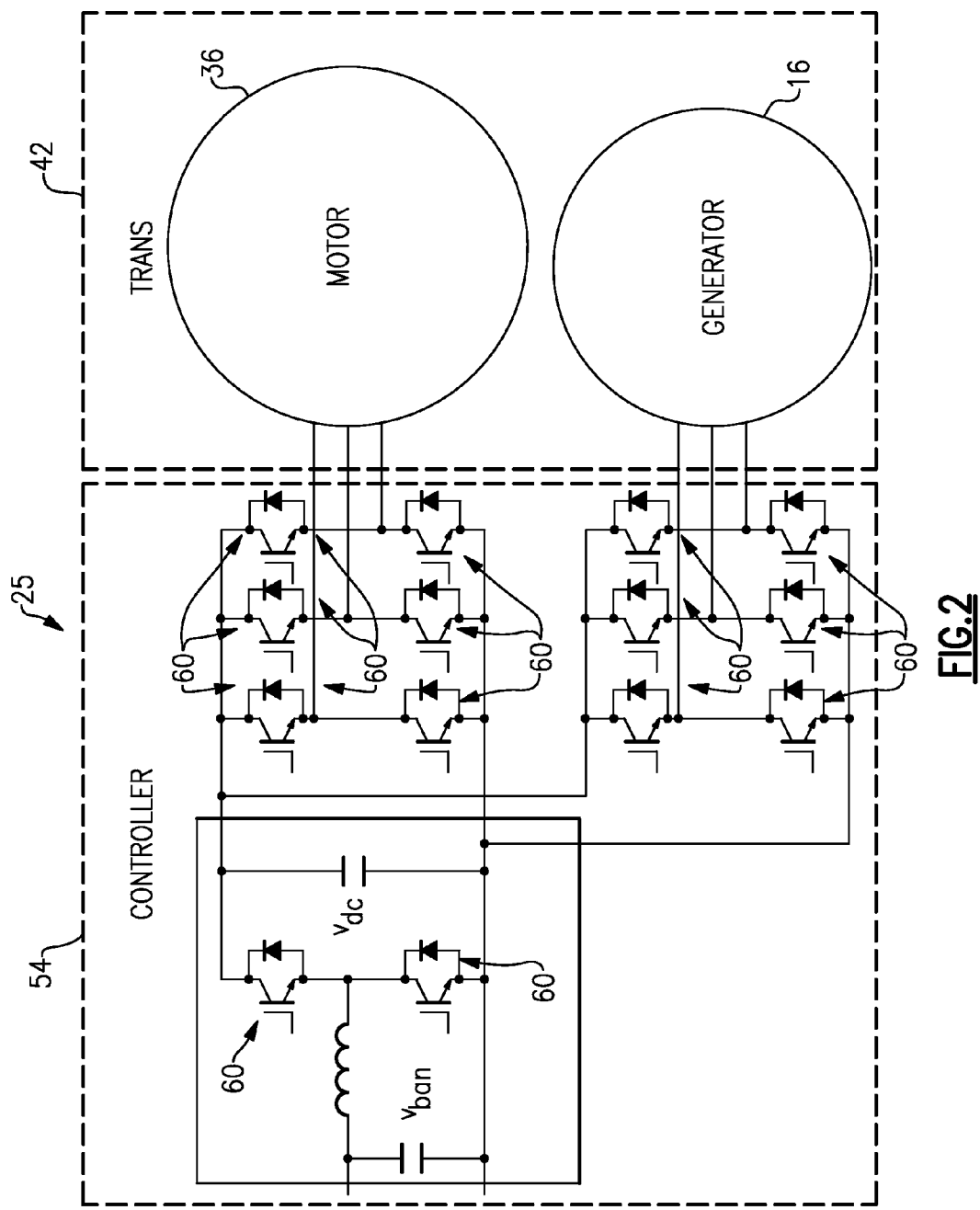
FIG. 2 illustrates part of an electric drive system of an electric vehicle.

FIG. 2 illustrates part of the electric drive system 25 of the electric vehicle 12 of FIG. 1. The controller 54 includes a plurality of switching units 60, such as integrated gate bipolar transistors, that selectively block current to the generator 16 and/or the motor 36. The switching units 60 support bidirectional power flow to and from the generator 16 and the motor 36.

Figure 3:
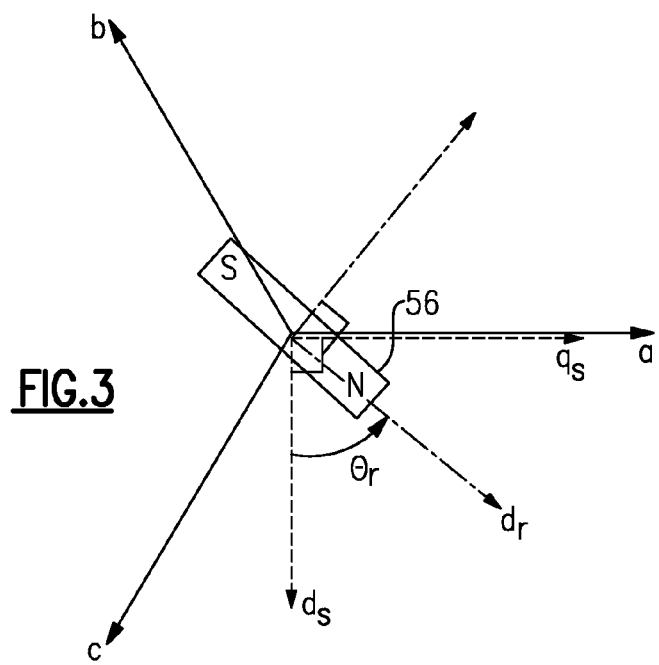
FIG. 3 illustrates a mathematical model of an electric machine rotor relative to a direct axis and a quadrature axis.

Referring to FIG. 3, electric machines such as the generator 16 and the motor 36 of FIG. 1 may include a rotor 56 (or shaft) that rotates to generate torque. The rotor 56 can be mathematically represented relative to a 3-phase stationary frame a, b, and c. The 3-phase stationary frame a, b and c may be represented in 2-D via a stationary d, q frame and a rotating d, q frame. For example, the stationary d, q frame includes a direct axis $d_s$ and a quadrature axis $q_s$, and the rotating d, q frame includes a direct axis $d_r$ and a quadrature axis $q_r$. The rotating d, q frame is aligned with movement of the rotor 56. Therefore, $\theta_r$ represents an angular positioning of the rotor 56. It may become necessary during certain conditions of the electric vehicle 12 to calculate the angular position $\theta_r$ of the rotor 56 in order to meet electric control requirements of the electric machine and/or to avoid inaccurate torque production.

Figure 4:
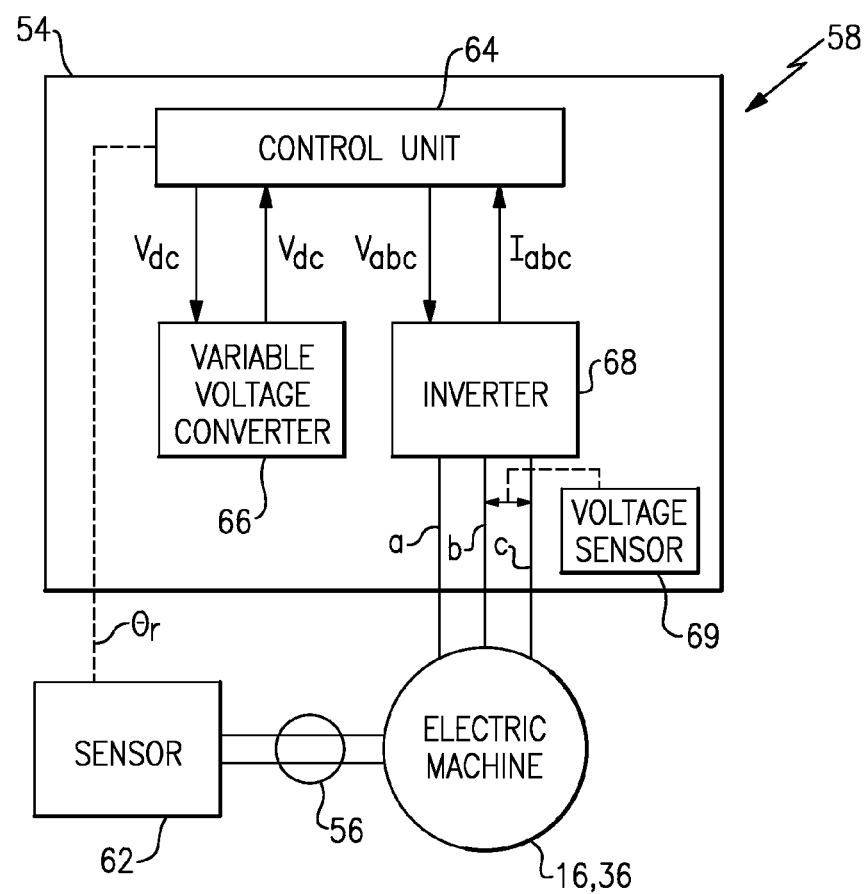
FIG. 4 illustrates a rotor position offset detection system that can be incorporated into an electric vehicle.

FIG. 4 illustrates a rotor position offset detection system 58 that can be incorporated into an electric vehicle, such as the electric vehicle 12 shown in FIG. 1. The rotor position offset detection system 58 determines rotor position offset of an electric machine 16, 36 (motor and/or generator). In one embodiment, the rotor position offset detection system 58 includes a sensor 62, a control unit 64, a variable voltage converter 66, and an inverter 68. The control unit 64, the variable voltage converter 66 and the inverter 68 may be part of the controller 54 or could be separate from the controller 54.

The sensor 62 may be a resolver, encoder, speed sensor, or another position sensor that is associated with the electric machine 16, 36. The sensor 62 monitors an angular position of the rotor 56 (or shaft) of the electric machine 16, 36. The sensor 56 may be mounted to or separate from the rotor 56. The sensor 56 communicates information to the control unit 64, such as rotor position information concerning the rotor 56.

The rotor position offset detection system 58 may use algorithms programmed into the control unit 64 to apply special voltage commands and use special processing of the feedback signals to determine any rotor position offset between the readings from the sensor 62 and an actual positioning of the rotor 56. For example, the control unit 64 may control 3-phase current in the electric machine 16, 36 by commanding 3-phase voltages Vabc to the inverter 68 and measuring the 3-phase current Iabc and rotor position $\theta_r$ as feedback form the inverter 68 and the electric machine 16, 36, respectively. This information may be compared to the information from the sensor 62 to determine whether a rotor position offset exists. Rotor position offset may result in inaccurate torque output. The variable voltage converter 66 may be used to convert a control signal to an appropriate voltage level for controlling the inverter 68, among other components.

The rotor position offset detection system 58 may additionally include a voltage sensor 69. The voltage sensor 69 is configured to measure a voltage across the windings b, c that extend between the inverter 68 and the electric machine 16, 36.

Figure 5:
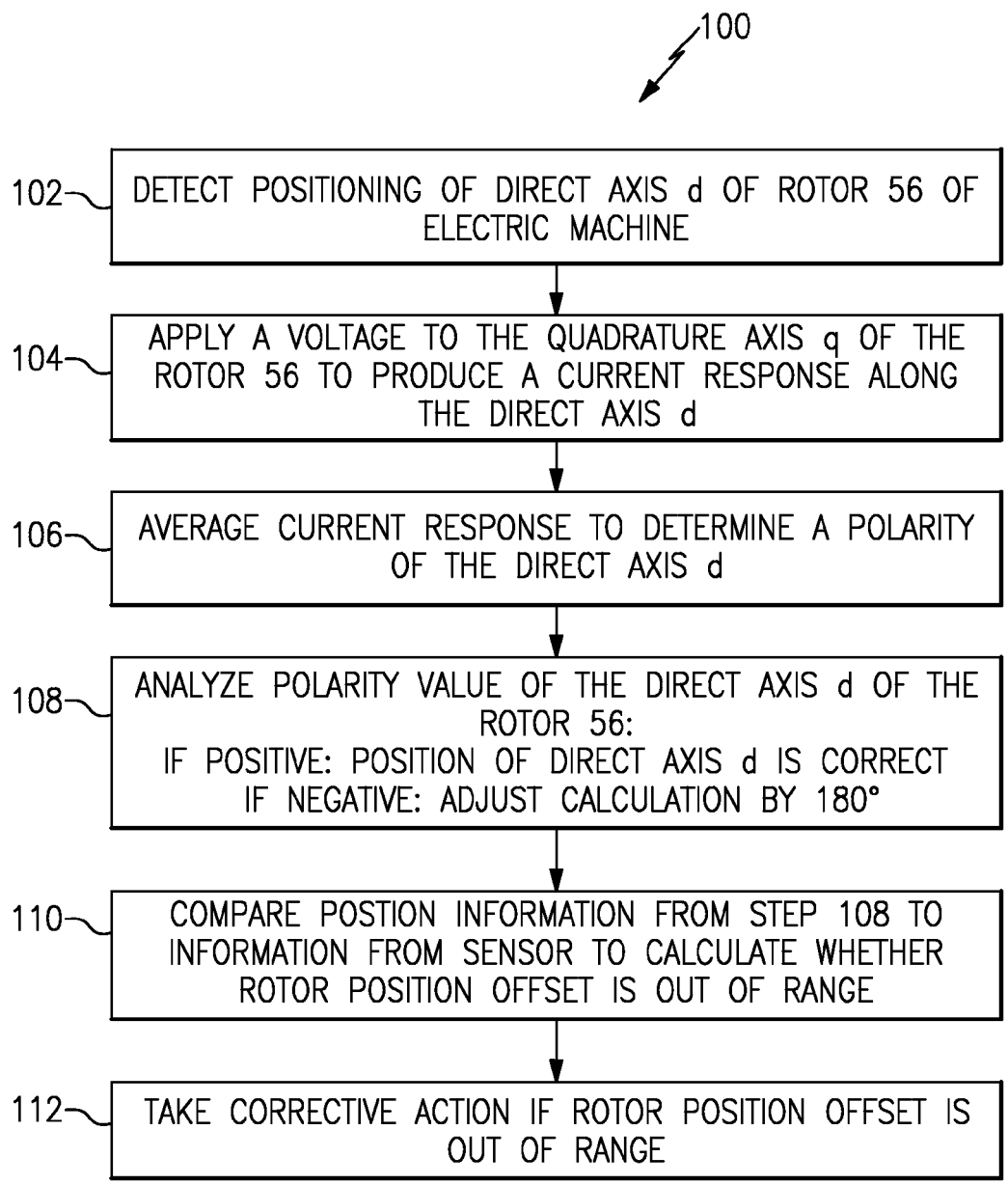
FIG. 5 illustrates a first embodiment of a method for determining rotor position offset of an electric machine.

A variety of methods or techniques can be used to calculate rotor position offset in an electric machine, such as by using the rotor position offset detection system 58 of FIG. 4. FIG. 5, with continued reference to FIGS. 1-4, schematically illustrates one exemplary method 100 of determining rotor position offset of an electric machine, such as the generator 16, the motor 36 or some other electric machine of the electric vehicle 12. The method 100 may be performed "in-vehicle," or without removing the transaxle 42 from the electric vehicle 12, and does not require spinning the rotor 56 (i.e., without the need to generate any torque or motion within the electric machine 16, 36). The method 100 may be referred to as a self-sensing signal injection method.

The self-sensing signal injection method 100 begins at step 102 by detecting a position of the direct axis d of the rotor 56 of an electric machine. For example, the position of the direct axis d of the rotor 56 may be determined by applying a first voltage of a first magnitude to the electric machine and then analyzing a current response from the electric machine to determine the position or alignment of the direct axis d. The first voltage may be a rotating voltage having a relatively high frequency, such as between 100 Hz and 500 Hz. In one embodiment, the current response from the electric machine is analyzed by processing the negative sequence current response from the electric machine in order to determine the alignment of the d axis (i.e., permanent magnet axis).

Once position or alignment is known, the polarity of the direct axis d of the rotor 56 must be determined. At step 104, a second voltage of a second magnitude is applied to the quadrature axis q of the rotor 56 to produce a current response along the direct axis d. In one embodiment, the second voltage is a different magnitude than the first voltage. The second voltage may be applied to the quadrature axis q using a sinusoidal pulsing voltage, which could include either a standard or square wave. The current response along the direct axis d is averaged at step 106 to determine the polarity of the direct axis d.

At step 108, the polarity value of the direct axis d of the rotor 56 is analyzed. For example, if the polarity calculated at step 106 is positive, the position of the direct axis d is considered correct. Alternatively, if the polarity is negative, the position calculation is adjusted by 180° to obtain the correct position of the direct axis d of the rotor 56.

At step 110, the position information of the direct axis d of the rotor 56 collected at step 108 is compared to information from the sensor (or resolver) that monitors a position of the rotor 56 to calculate whether a rotor position offset is out of range. Finally, at step 112, a corrective action is taken if it is determined that a rotor position offset is out of range. Exemplary corrective actions include correcting the offset (i.e., aligning the rotor 56 back to the zero position) and continuing operation of the electric machine of the electric vehicle 12, setting a diagnostic troubleshooting code, and/or entering a limited operating mode of the electric vehicle 12.

In one embodiment, the method 100 is performed in response to a pre-defined prompt. For example, the method 100 can be performed at least at every key-on condition of the electric vehicle 12. In another embodiment, the method 100 can be performed in response to detecting a rotor speed that is within a specified range of speeds. In another embodiment, the method 100 is performed in response to a pre-programmed current command range. In yet another embodiment, the method 100 can be performed at specified intervals, such as a specific amount of time or distance the electric vehicle 12 has been operated. The pre-defined prompt may additionally be related to an electric machine reset or servicing condition.

Figure 6:
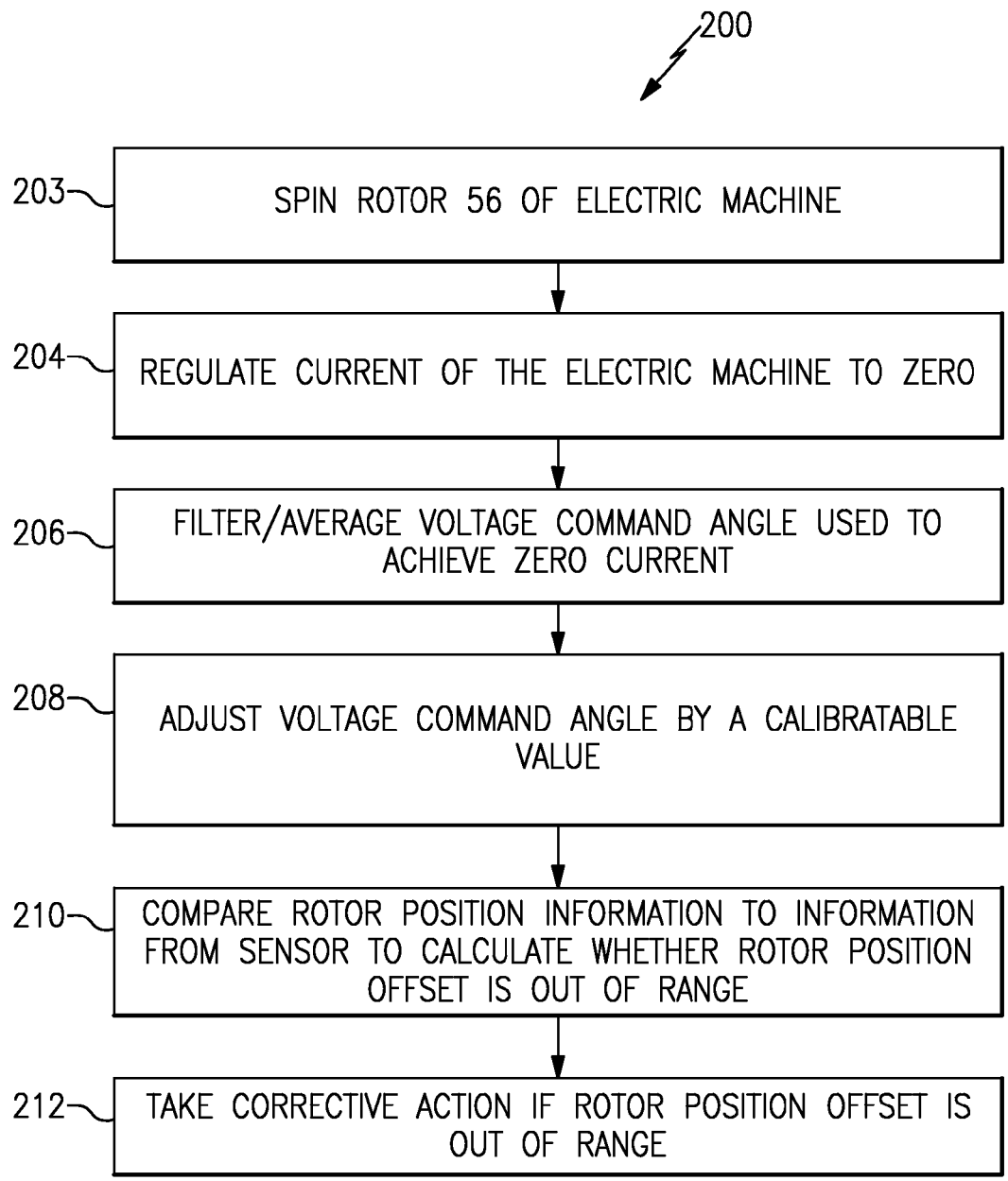
FIG. 6 illustrates a second embodiment of a method for detecting rotor position offset of an electric machine.

FIG. 6 schematically illustrates another embodiment of a method 200 for determining rotor position offset of an electric machine. The method 200 may be performed "in-vehicle," i.e., without removing the transaxle 42 from the electric vehicle 12. The method 200 may include spinning the rotor 56; however, the method 200 may be performed without the need to generate any torque or motion within the electric machine 16, 36. The method 200 may be referred to as the voltage command tracking method.

The voltage command tracking method 200 may begin at step 202 by optionally spinning the rotor 56 of the electric machine at a speed that is between a minimum speed and a maximum speed of the electric machine. The method 200 may be executed during the normal course of vehicle operation and whenever certain conditions are met (i.e., speed within certain range, current command to zero, etc.). The rotor 56 may be spun in a variety of ways. In one embodiment, the rotor 56 may be spun without moving the vehicle drive wheels 30, such as by using the engine 14 to drive the generator 16 or the motor 36. In another embodiment, the rotor 56 is spun by moving the vehicle drive wheels 30 (the electric vehicle 12 may move or be hoisted), such as by driving an electric machine with the engine 14, driving the motor 36 with both the engine 14 and the generator 16, or using a service tool to spin the vehicle drive wheels 30. Other methods may also be utilized to spin the rotor 56 of an electric machine.

Next, at step 204, the current of the electric machine is actively regulated to zero. Regulating the current in this way cancels back electromotive force (EMF) associated with the electric machine. The voltage command angle that is used to achieve zero current can then be filtered or averaged at step 206. The voltage command angle can be low-pas filtered or averaged over a calibratable time window. At step 208, the voltage command angle may be adjusted by a calibratable value to obtain the rotor position. For example, 90° may be subtracted/added from the voltage command angle to obtain the rotor position. For example, 90° may be added to the voltage command angle if the speed is determined to be negative, or could be subtracted from the voltage command signal if the speed is positive.

At step 210, the rotor position information is compared to information from the sensor (or resolver) that monitors the position of the rotor 56 to calculate whether a rotor position offset is out of range. Finally, at step 212, a corrective action is taken if it is determined that a rotor position offset is out of range.

Figure 7:
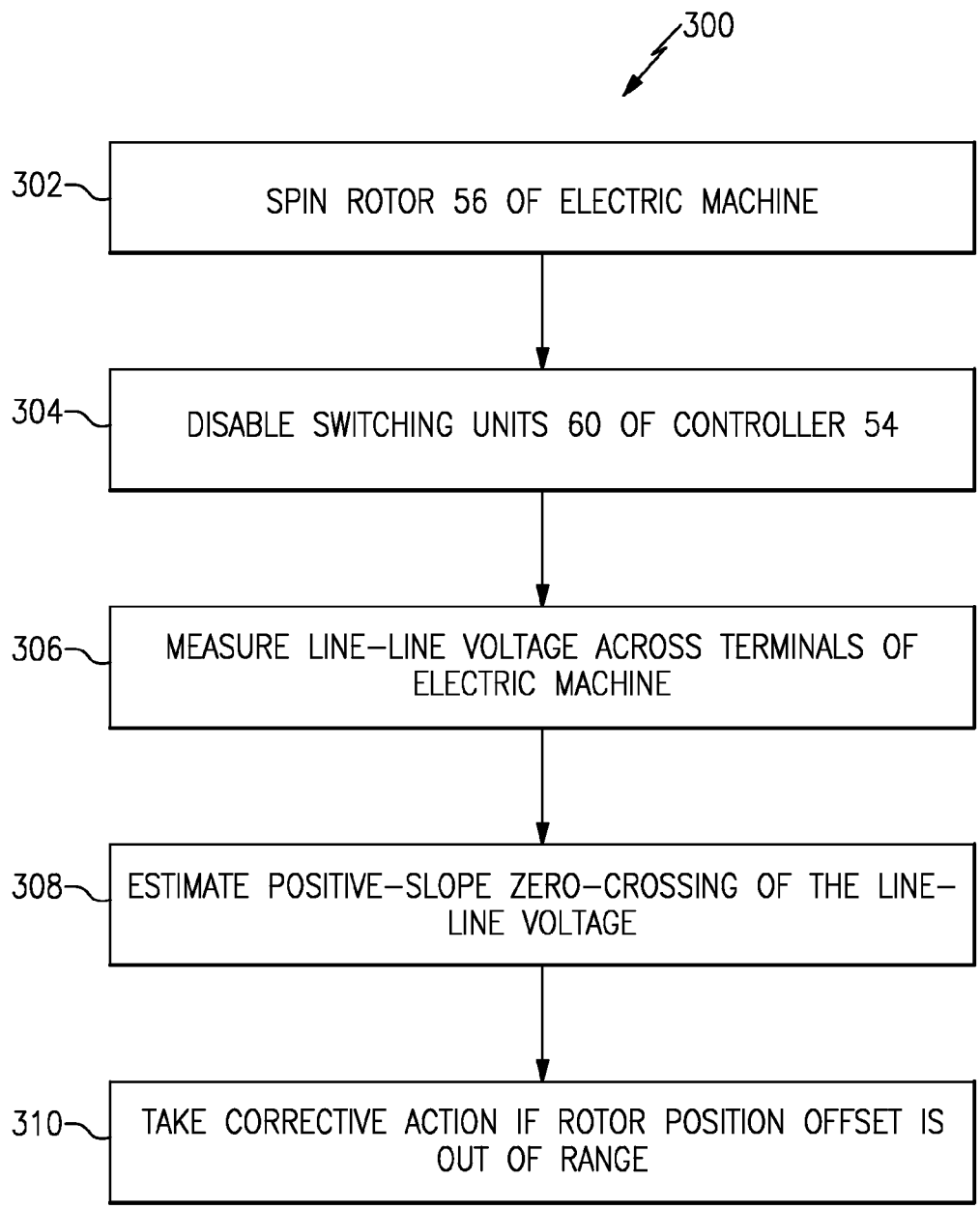
FIG. 7 illustrates a third embodiment of a method for determining rotor position offset of an electric machine.

FIG. 7 schematically illustrates another exemplary method 300 for determining rotor position offset of an electric machine. The method 300 may be performed "in-vehicle," i.e., without removing the transaxle 42 from the electric vehicle 12, and optionally requires spinning the rotor 56. However, like the methods 100, 200, the method 300 can be performed without the need to generate any torque or motion within the electric machine 16, 36. The method 300 may be referred to as the back electromotive force (EMF)-to-position signal comparison method.

The method 300 may begin at step 302 by optionally spinning the rotor 56 of the electric machine. The rotor 56 may be spun at a speed that is between a minimum speed and a maximum speed of the electric machine. Similar to the method 200, the rotor 56 may be spun with or without moving the vehicle drive wheels 30.

The switching units 60 of the controller 54 may be disabled at step 304. In one embodiment, the switching units 60 are disabled by not applying voltage signals to their gate drivers.

Next, at step 306, the line-line voltage across the B & C (or V & W) terminals of the three phase electric machine is measured. In one embodiment, a tool, such as the voltage sensor 69 (see FIG. 4), is used to perform the measuring step. A positive-slope zero-crossing of the line-line voltage is estimated using the tool at step 308. The position sensor reading at the positive slope zero-crossing is representative of the rotor position error (i.e., rotor position offset). Finally, at step 310, a corrective action is taken if it is determined that a rotor position offset is out of range.

Figure 8:
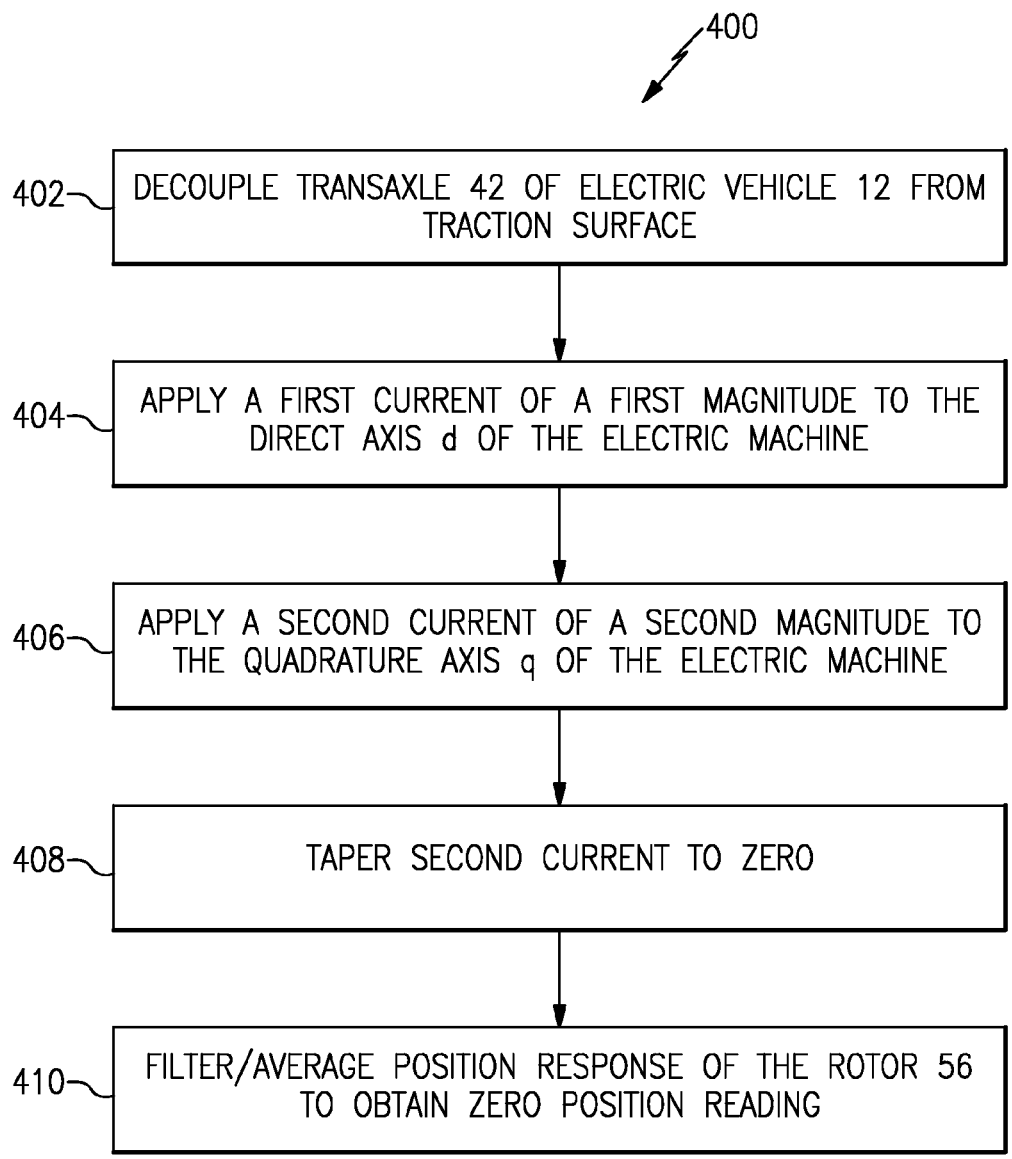
FIG. 8 illustrates a fourth embodiment of a method for determining rotor position offset of an electric machine.

FIG. 8 schematically illustrates yet another method 400 for determining rotor position offset of an electric machine.

The method 400 may be performed "in-vehicle" and requires minimal movement of the rotor 56. The method 400 may be referred to as the decaying sinusoidal torque method. In the decaying sinusoidal torque method 400, a decaying sinusoidal torque is applied to the electric machine to move it into a certain position.

At step 402, the transaxle 42 of the electric vehicle 12 is optionally decoupled from a road or other traction surface, such as by hoisting the electric vehicle 12. The method 400 then continues to step 404 by applying a first current of a first magnitude to the direct axis d of the electric machine. The first current may be a constant current, in one embodiment. Next, at step 406, a second current of a second magnitude and frequency is applied to the quadrature axis q of the electric machine. The second current of the quadrature axis q is tapered to a configurable amplitude at a calibratable taper rate, such as by using a linear ramp or an exponential decay, at step 408. This causes the rotor 56 to oscillate around and decay toward a zero position of the electric machine. At step 410, the position response of the rotor 56 is filtered/averaged to obtain a zero position reading, thereby enabling calculation of the rotor position offset.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
    detecting an incorrect rotor position offset of an electric machine using a decaying sinusoidal torque, wherein using the decaying sinusoidal torque includes tapering a current applied to the electric machine to move a rotor of the electric machine toward a zero position of the electric machine.

2. A method, comprising:
    detecting an incorrect rotor position offset of an electric machine using a decaying sinusoidal torque, wherein using the decaying sinusoidal torque includes:
        applying a first current of a first magnitude to a direct axis of a rotor of the electric machine;
        applying a second current of a second magnitude to a quadrature axis of the rotor;
        tapering the second current to a configurable amplitude at a calibratable taper rate; and
        filtering a position response of the rotor to identify a zero position.

3. The method as recited in claim 2, wherein the step of tapering includes using one of a linear ramp and an exponential decay.

* * * * *